United States Patent
Imanbayev et al.

(10) Patent No.: US 7,189,007 B2
(45) Date of Patent: Mar. 13, 2007

(54) TERMINATION FOR OPTIC FIBER

(75) Inventors: Talapker Imanbayev, Lake Oswego, OR (US); Ralph Ebbutt, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 11/055,397

(22) Filed: Feb. 9, 2005

(65) Prior Publication Data

US 2006/0177183 A1    Aug. 10, 2006

(51) Int. Cl.
*G02B 6/36* (2006.01)

(52) U.S. Cl. .............................. 385/77; 385/31; 385/33; 385/84; 385/85; 385/88; 385/89; 385/92; 385/93; 385/78; 385/94; 385/80

(58) Field of Classification Search .................. 385/49, 385/88, 89, 76, 77, 78, 80, 81, 92, 93, 94, 385/79, 31, 33, 35, 84, 85
See application file for complete search history.

(56) References Cited

U.S. PATENT DOCUMENTS

| | | | |
|---|---|---|---|
| 5,345,336 A | 9/1994 | Aoyama et al. | 359/628 |
| 6,874,950 B2 * | 4/2005 | Colgan et al. | 385/88 |
| 2002/0076152 A1 * | 6/2002 | Hughes et al. | 385/35 |
| 2002/0131727 A1 * | 9/2002 | Reedy et al. | 385/88 |
| 2003/0010904 A1 * | 1/2003 | Luo | 250/227.11 |
| 2003/0201462 A1 | 10/2003 | Pommer et al. | 257/200 |
| 2003/0235366 A1 * | 12/2003 | Chan et al. | 385/38 |
| 2004/0033016 A1 | 2/2004 | Kropp | 385/24 X |
| 2005/0169597 A1 * | 8/2005 | Colgan et al. | 385/137 |

* cited by examiner

*Primary Examiner*—Brian M. Healy
(74) *Attorney, Agent, or Firm*—Bennet K. Langlotz; Thomas F. Lenihan

(57) ABSTRACT

A terminal element for fiber optic communication has an elongated body defining a body axis and having a first end from which an optical fiber extends along the body axis. The body has a second end with an angled surface offset at an angle from the body axis. The fiber extends through the length of the body, and terminates at a fiber end surface flush with the angled surface. A lens element is positioned adjacent to the angled surface. The fiber may be hermetically sealed to the body at a position away from first end, and may be sealed with a flexible material at the first end.

23 Claims, 2 Drawing Sheets

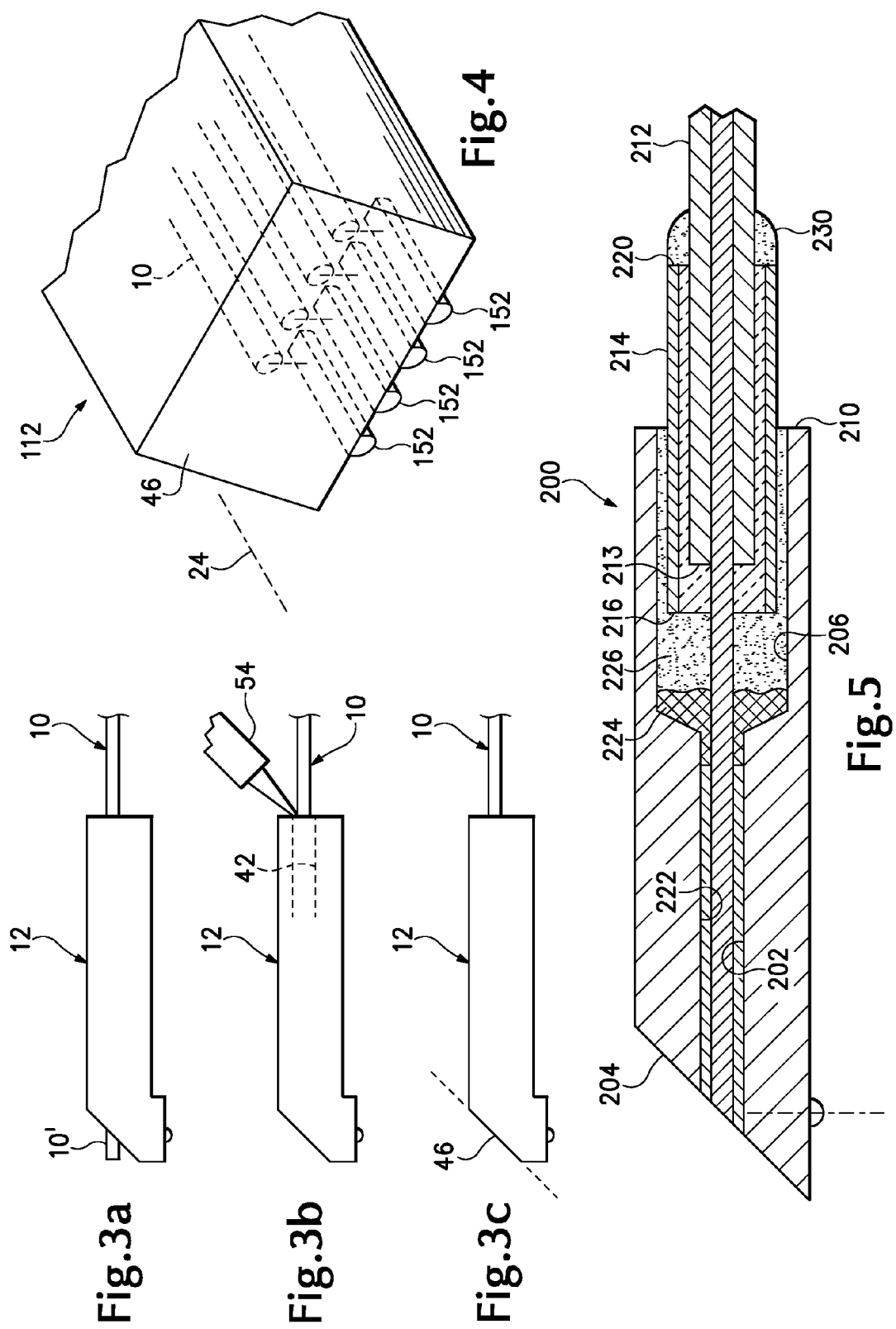

TERMINATION FOR OPTIC FIBER

FIELD OF THE INVENTION

This invention relates to devices for terminating optical fibers, and more particularly to interfacing optical fiber arrays with active opto-electronic devices, such as photodetector and laser arrays.

BACKGROUND OF THE INVENTION

Fiber optic cables are used for high speed data transmission in many applications. This includes long distance telecommunications and computer networks, and smaller networks such as those used on advanced aircraft. Typically, a fiber optic cable carries a signal from a remote emitter, to be received by a detector on an electronic instrument such as a computer, relay station, communications hub, or the like. The fiber must be terminated in a manner, that couples the light onto a photodetector and/or coupled light from the light source (laser or LED array) into the fiber. Such terminal elements may include lenses that receive the light signal from the light source and focus it onto the fiber or receive the light from the fiber, and focus it onto the receptor. In many applications, multiple independent fibers will carry independent signals, and the terminal will have several lenses to focus the beams from several emitters onto their respective fibers or from several fibers onto a corresponding array of detectors.

Some applications such as outdoor communications hubs and military hardware require environmental seals, often hermetic, to prevent damage, performance degradation, and premature failure due to harsh environmental conditions. This presents a significant challenge for fiber optic terminations, which are analogous to collimated flash lights positioned with micron-level precision. The termination must provide optical coupling, provide mechanical strain relief and often must provide a hermetic seal. Typical hermetically sealed components are bulky, making miniaturization of fiber optic terminal elements difficult. Moreover, hermetic seals often employ rigid materials that create a stress point where the fiber enters the material, making the fiber susceptible to damage, degradation, and breakage.

Miniaturization is particularly important in avionic and other mobile systems where size and weight are significant constraints. For example, it is highly desirable to pack as many system cards as possible into a rack to save space and weight. This can be accomplished by minimizing the height of electronic circuit boards electro-optic components such as emitters and detectors and the associated optical fiber interface. Optical fibers are made from glass and cannot be bent sharply without suffering optical loss or breakage. If the active area of the electro-optic device is coplanar with the circuit board to which it is mounted, then an optical component that folds the optical path is highly desirable. In addition, miniaturized parts have the added challenge of being more sensitive to misalignment, so that precision of manufacture and positioning during assembly is more critical. Consequently, there is a need for a readily manufactured fiber termination that is compact, low-profile, and can be precisely aligned.

SUMMARY OF THE INVENTION

A termination element for an optical fiber has an elongated body defining a body axis and having a first end from which an optical fiber extends along the body axis The body has a second end with an angled surface offset at an angle from the body axis. The fiber extends through the length of the body, and may terminate at a polished, angled surface. A lens or array of lens elements is positioned adjacent to the angled surface. The fiber may be hermetically sealed to the body at a position between the first and second end of the body, and may be sealed and strain relieved with a flexible material at the first end of the body. An array of lenses may be integrally formed in proximity to the second end to enable the divergent light rays from the turning prism surface to be focused or converged upon a detector, or the divergent light arrays from the light source to be focused or converged upon a corresponding fiber array.

BRIEF DESCRIPTION OF THE DRAWINGS

FIGS. 3a–c are side views of the embodiment of FIG. 1 illustrating steps of manufacturing.

FIG. 4 is a perspective view of an alternative embodiment of the invention.

FIG. 5 is a sectional side view of a further alternative embodiment of the invention.

DETAILED DESCRIPTION OF A PREFERRED EMBODIMENT

Figure 1:
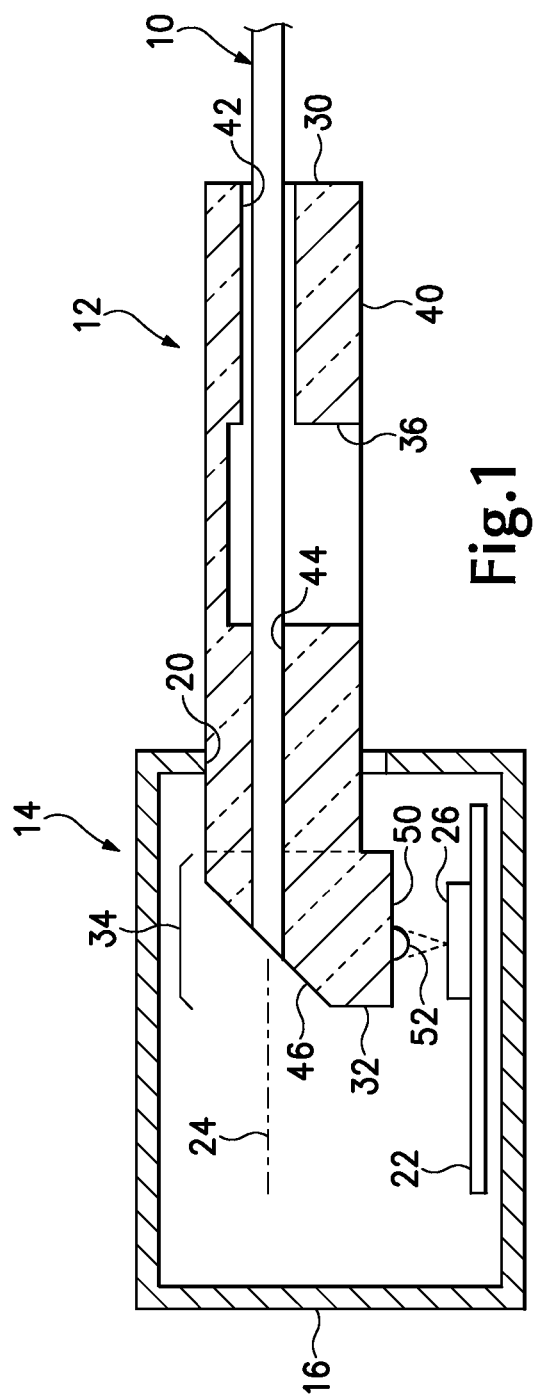
FIG. 1 is a sectional side view of a fiber optic cable assembly according to a preferred embodiment of the invention.

FIG. 1 shows an optical fiber cable 10 with a terminal element 12 connected for interfacing with an electronic instrument or communications module 14. The fiber optic cable has four multi-mode optical fibers that extend some distance to a remote communications device (not shown) that is sending and/or receiving signals or data to or from the module 14. In alternative embodiments the fibers may be single-mode or any other type, and may be used in a bundle of any number of fibers, or with a single fiber.

The module 14 may be any type of electronics or communications instrument or component thereof that requires communication with a remote external device. The module may be used for a telecom local station, or other communications or relay stations used for Internet or other computer networks, including networks found on vehicles such as automobiles and aircraft. The embodiment is well-suited for applications where harsh environmental conditions are experienced, and where high reliability is required. This includes applications requiring hermeticity of electronic components.

The module 14 includes an environmentally protective housing 16 shown in simplified form with an aperture 20 for receiving the cable termination 12. The housing includes a circuit board 22 connected to other circuitry (not shown) inside or outside of the housing, The board is oriented perpendicularly to the housing wall in which the aperture is defined, parallel to an axis of insertion 24 of the terminal. The board includes an array of electro-optic transducers which may include photo-receptors for receiving optical signals from the cable, and converting them to electronic signals for the circuitry, an array of emitters for sending signals through the cable, or emitter-detector pairs for two way communication via the cable. In the preferred embodiment with n fibers, the transducer has n receptors arranged on the same spacing as the fibers in the terminal, where n≧1.

Figure 2:
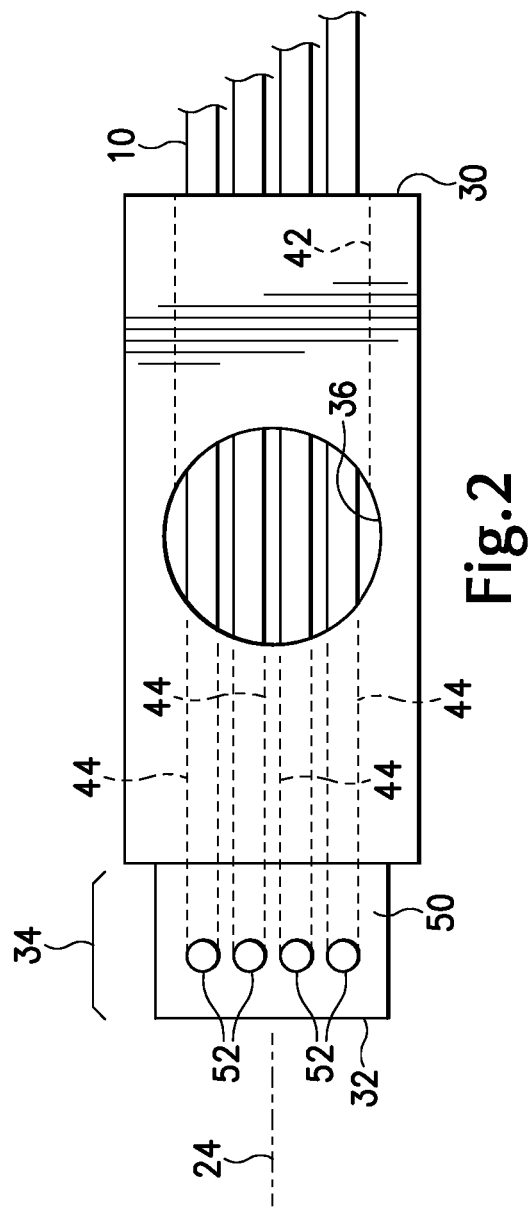
FIG. 2 is a plan view of the embodiment of FIG. 1.

The terminal 12 is formed primarily of a single, integrally formed monolithic block of rigid material such as glass or ceramic. The block has an elongated shape with a first end 30 facing toward the extending length of the cable 10, and a second end 32 for insertion into the housing 16. The block has a rectangular cross section that preferably remains constant along its length, although in alternative embodiments, and cross section may vary to accommodate bare or jacketed fiber or additional spatial constraints imposed by the housing 16, except for a prism portion 34 at the second end. A recess 36 is defined at an intermediate position along the length of the block from an upper major face or lower major face 40, and having a width or diameter greater than the width of the bare fiber array as shown in FIG. 2. Returning to FIG. 1, the recess has a depth greater than half the thickness of the block, so that it extends beyond the fibers.

The block defines a straight pathway entirely through its length for the fibers 10 to pass through. Between the recess 36 and the first end 30, the pathway is provided by a single passage 42 having an oblong or rectangular cross section, and a width and height sized larger than the cable bundle to loosely receive the fibers. Between the recess and the second end 32, the pathway is provided by n discrete bores 44 aligned in a common plane parallel to the lower face. Each bore is a straight cylindrical bore sized to closely receive a fiber, and each fiber is set with index-matched adhesive with respect to the main body 12, where the index of refraction of the main body 12 and the index-matched adhesive are equal to the index of refraction of the fiber cladding.

The prism portion 34 is a block-like extension with a narrower width than the main portion, as shown in FIG. 2, with an angled prism face for reflecting the light and a lower output face for transmitting the light. The width of the prism portion is just greater than the width of the array of fibers in the preferred embodiment, or it may be as wide as the main body 12 in alternative embodiments. The prism face is an angled reflective surface 46 that is offset from the major plane of the body, about a horizontal axis perpendicular to the plane of FIG. 2. The horizontal surface portion 50 of the prism portion includes arrays of integrally formed lenses 52 with the number of lenses equal to the number of fibers or desired optical channels. The integral molding or a laser micro-machining process used to form the block allows very precise tolerances to be held, so that the lenses are precisely aligned to other physical features of the block which may be used for alignment and registration with the ferrule or components within the module.

Light may originate from an active optical component such as a laser, and the focal length of the lenses can be chosen to either magnify or demagnify the size of the source of the light at the output end of the optical component.

The lenses are arrayed with a spacing the same as the bores 44, and at a position immediately below the point at which the center of each bore intersects the reflective surface. The reflective surface is highly polished, and can be coated with a reflective material such as a metallic or dielectric coating to efficiently reflect light to or from the fiber, but such coatings are not necessary for total internal reflection. The lenses are positively curved aspheric elements that have a focal length set approximately to the distance between the lenses and the surface of the transducer 26, so that the nearly parallel rays from the fibers will be focused in a small spot on the transducer. In the preferred embodiment, this spacing is 0.250 mm and the focal length is 0.300 mm. The lenses may also be uncoated or coated, to improve coupling efficiency by reducing reflections at the lens surface, or a non-absorbing reflective coating may be applied to the lens elements 52 or 152 to intentionally reduce or attenuate the light power captured by the lenses.

FIGS. 3a–c show the process of connecting the terminal to a cable. In FIG. 3a, the block 12 has been provided, and the fibers inserted into the passage and bores until an end portion 10' extends beyond the reflective surface 46, and fixed with index-matched adhesive inside the precision bores in the main body. Then, the fibers are hermetically sealed to the block. Hermetic sealing is provided by applying solder or glass to the feature 36 at which the fibers are exposed, with the application made at the receptacle 36. In the process, with an application of heat, the glass or solder wicks into the small gap between each fiber and its bore 44, providing a leak-proof hermetic seal. This results in a rigid bond that would otherwise create stress concentrations if the fibers were flexed near their exits from the bores. Thus, the rigid bonding material is kept away from the passage 42, especially near the first end 30 of the block where the fibers exit.

To stabilize the fibers to prevent stress-inducing flexure at the point of hermetic sealing, the passage 42 is filled with elastomeric sealant such as silicone 54, as shown in FIG. 3b. This stabilizes the fibers, while providing strain relief when the fibers are flexed with respect to the end of the block. The sealant, unlike hermetic solder materials, is softer and more flexible than the fibers themselves.

As shown in FIG. 3c, the fiber ends 10' are then cut or ground flush with the reflective surface 46, and polished flush with the surface.].

The angled polished ends of the fibers serve as the mirrors for reflecting income light in the fibers by 90°, toward the lenses 52. A typical optical fiber has outer cladding of a different optical index than the core, which generates total internal reflections to facilitate efficient propagation of the beam within the fiber along the overall length of the optical link. However, this internal reflection is effective only at very small (glancing) angles. Thus, after the beam is reflected from the surface 46, it passes through the cladding at an oblique angle (perpendicular for those rays at the center of the fiber) that does not prevent the light from escaping the fiber. Unlike conventional fiber operation, the cladding functions like a transparent window, and not a reflective conduit.

As constructed, the fiber and terminal are fully hermetic. If hermeticity with respect to the instrument housing 16 is desired, the material of the terminal block is suitable for hermetic sealing with a corresponding aperture in the housing.

The preferred embodiment is one of many different possible configurations employing the above features and principles. In the preferred embodiment, the block has a length of 6–7 mm, and thickness of 1.0–1.5 mm, and a width of 3.0–4.0 mm. The fibers and associated lenses and bores are arranged at a center-to-center spacing of 0.250 mm. The preferred material for the block is glass, although suitable non-hermetic substitutes include optical-grade thermosetting polymers, such as poly-olefin. The preferred material for the hermetic solder is glass solder applied as a perform (a solid element shaped to fit the cavity, and then melted by application of heat), and the preferred material for the elastomeric seal is silicone. The fiber has a numerical aperture of 0.2 to 0.3, and the body an index of 1.48–1.52. There is also an index-matched adhesive distributed about the fiber end that is integral with the turning prism surface, and set with respect to the fiber array block to ensure efficient coupling from the cladding to the main body to the focusing lenses 52. The external surface of the main body may be metallized as well for sealing the body 12 in the aperture(s) 20 of the housing 14. In this case the metallization should encompass the periphery of the main body and extend for a limited width that overlaps with housing aperture features in order to limit the required volume of solder required to seal the body 12 into the aperture(s) 20.

FIG. 4 shows an alternative terminal element 112 which is essentially the same as in the embodiment of FIG. 1, except that instead of the spherical lenses 52, it employs cylindrical lenses 152 each lens is an elongated rib with a semi-circular, parabolic, or other profile that is constant along a line parallel to the length of the terminal, and to the terminal axis 24. The cylindrical shape is believed to be more readily manufactured by certain processes such as laser etching, and is suitable for applications where optical attenuation is of limited concern. Each cylindrical lens is designed to form a distinct stripe aligned with the cylinder, so that rays converge below each lens to avoid cross-talk to the sensors or emitters associated with adjacent lenses.

FIG. 5 shows an alternative embodiment terminal 200 with a different strain relief than in the embodiment of FIG. 1. The terminal body defines a narrow bore 202 for each fiber, extending from an intermediate position in the body to the angled surface end 204. The bores open up into a large passage 206 that has a rectangular cross section, and which extends to the rear 210 of the body. A jacketed fiber 212 enters the rear of the body, and the jacketing ends at an intermediate location 213 within the passage 206, and the fiber continues on through the bore 202 to the angled surface. A strain relief sleeve 214 has an oblong cross section, and partially extends into the passage, with a forward end 216 extending inward beyond the end of the jacket 213, and a rear end 220 extending well beyond the rear surface 210 of the body. A ribbon of jacketed fibers is received within the strain relief sleeve, and each fiber passes through a single bore in the ferrule before the hermetic seal area 36, after which the fibers are positioned in individual precision bores.

Each fiber is sealed within the bore with an indexed-matched adhesive 222 that is essentially matched to the index of the body and the fiber, so that after reflection off surface 204, the beam continues without interruption. The adhesive fills the length of each bore, except for a limited portion adjacent to the passage. The remaining length of each bore and a limited portion of the passage adjacent to the bores is sealed with glass solder 224, which provides the needed hermetic seal. An adhesive 226 fills the reminder of the passage, including any gaps between the cables and the sleeve. A bead of silicone 230 or other elastomer is applied about the cables where they exit the sleeve, to provide a strain relief that prevents sharp bending at the end of the sleeve. The sleeve is formed of a rigid plastic material, but may also be formed of somewhat more flexible or resilient materials to provide a limited strain relief for large forces beyond those that the silicone bead is capable of withstanding. In this instance, the sleeve is considered as an element of the body, and the silicone is thus applied essentially between the fiber and the body.

While the above is discussed in terms of preferred and alternative embodiments, the invention is not intended to be so limited. For instance, the fiber array may be arranged in a matrix of two or more rows of fibers, with the lens array in a corresponding matrix. Moreover, where discussed in terms of light traveling one direction (such as entering light being detected), the disclosure also applies to the reverse (such as emitted light being transmitted), or to both.

The invention claimed is:

1. A terminal element for fiber optic communication comprising:
    an elongated body having a lengthwise pathway defining a body axis and having a first end from which an optical fiber extends along the body axis;
    the body having a second end with an angled surface offset at an angle from the body axis, the pathway including a bore for closely holding the optical fiber terminating at the second end;
    the fiber extending through the length of the body, and terminating in the bore at a fiber end surface flush with the angled surface; and
    the body defining a lens element adjacent to the angled surface.

2. The element of claim 1 wherein the lens element is a cylindrical lens.

3. The element of claim 1 wherein the angled surface and fiber end surface are flush, and polished to form a continuous surface.

4. The element of claim 1 wherein the body is a single element with an integrally formed lens.

5. The element of claim 1 including an array of multiple fibers, and wherein the body defines a corresponding array of lenses.

6. The element of claim 1 wherein the fiber is hermetically sealed in the bore.

7. The element of claim 6 wherein an elastomeric sealant is applied between the fiber and the body at the first end of the body.

8. The element of claim 1 wherein an adhesive having an optical index matched to an optical index of the body is applied between a limited portion of the fiber adjacent to the angled surface and the body.

9. A terminal element for fiber optic communication comprising:
    an elongated body defining a body axis and having a first end from which an optical fiber extends along the body axis;
    the body having an opposed second end;
    the body defining a lens element adjacent to the second end;
    the body defining a passage along the axis from the first end to the second end;
    the fiber occupying the passage;
    a flexible material being applied between the fiber and the body at a first passage portion adjacent to the first end to provide flexible support of the fiber; and
    a rigid material being applied between the fiber and the body at a second passage portion adjacent to the second end to provide an environmental seal between the fiber and the body.

10. The element of claim 9 wherein the environmental seal is a hermetic seal.

11. The element of claim 9 wherein the flexible material is an elastomer.

12. The element of claim 9 wherein the rigid material is a hermetic sealant.

13. The element of claim 9 wherein the first passage portion loosely receives the fiber, and the second passage portion closely receives the fiber.

14. The element of claim 9 wherein the body defines an intermediate opening at an intermediate position along the length of the body between the first passage portion and the second passage portion.

15. A method of manufacturing a fiber optic cable terminal comprising the steps:

providing an elongated body defining a bore;

inserting a first end of an optical fiber through the bore to extend the length of the body beyond a first end of the body such that an opposed second end extends well beyond a second end of the body;

sealing the first end of the fiber to the bore;

forming a polished surface at the first end of the body, including polishing the first end of the optical fiber flush with the first end; and wherein the polished surface is offset at an angle from an axis defined by the length of the body.

16. The method of claim 15 wherein the body includes an integrally molded lens adjacent to the polished surface, and wherein the polished surface is formed at an angle to direct light from the fiber to the lens.

17. The method of claim 16 wherein the polished surface is oriented at a 45 degree angle with respect to axis of the body.

18. The method of claim 15 including applying a flexible sealant between the fiber and the body at the second end of the body.

19. The method of claim 15 wherein sealing the first end includes applying a rigid sealant.

20. The method of claim 15 wherein sealing the first end includes hermetically sealing at least a portion of the fiber to the body.

21. The terminal as recited in claim 1 wherein the body further comprises a recess intermediate the first and second ends.

22. The terminal as recited in claim 21 wherein the pathway comprises a passage from the recess to the first end for loosely receiving the optical fiber and the bore extends from the recess to the second end.

23. A terminal for an optical fiber comprising:

a rigid, elongated body having a pathway extending lengthwise from a first end of the body to an angled second end of the body and having an intermediate recess between the first and angled second ends, the pathway having a bore extending from the intermediate recess to the angled second end for closely receiving an end of the optical fiber and a passage extending from the intermediate recess to the first end for loosely receiving the optical fiber; and a lens at the angled second end for coupling light to and from the end of the optical fiber.

* * * * *